W. D. JOHNSON.
Seed-Planter.

No. 25,417.

Patented Sept. 13, 1859.

Witnesses
Henry C. Smith
R. J. Fleming

Inventor
W. D. Johnson

UNITED STATES PATENT OFFICE.

W. D. JOHNSON, OF RALEIGH, NORTH CAROLINA.

IMPROVEMENT IN SEEDING-MACHINES.

Specification forming part of Letters Patent No. 25,417, dated September 13, 1859.

*To all whom it may concern:*

Be it known that I, W. D. JOHNSON, of Raleigh, in the county of Wake and State of North Carolina, have invented a new and Improved Seeding-Machine; and I do hereby declare that the following is a full, clear, and exact description of the same, reference being had to the annexed drawings, making a part of this specification, in which—

Figure 1:
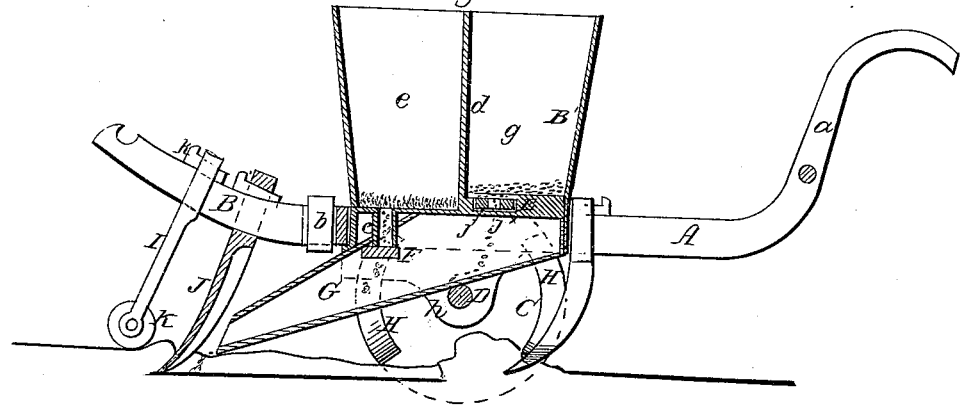
Figure 2:
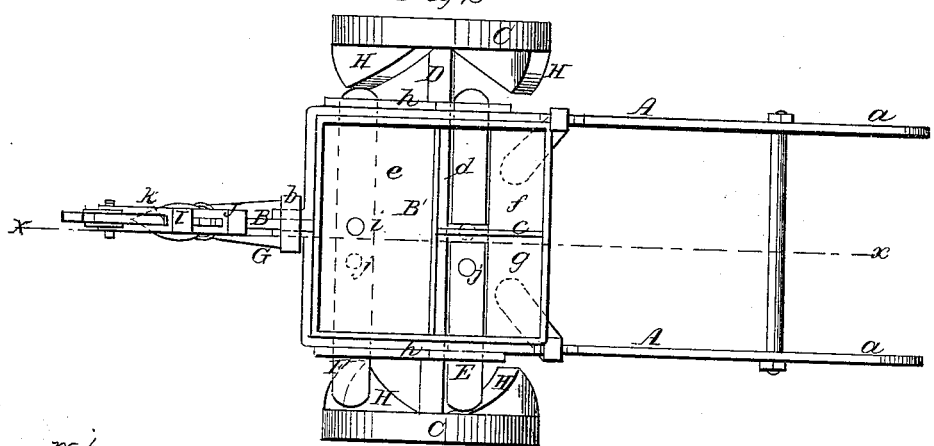

Figure 1 is a side sectional view of my invention, taken in the line $x\ x$, Fig. 2. Fig. 2 is a plan or top view of the same.

Similar letters of reference indicate corresponding parts in the two figures.

The object of this invention is to obtain a seeding-machine capable of planting two different kinds of seed in alternate hills, and also drop therewith a fertilizing material in such a manner that a stratum of earth will intervene between the fertilizer and seed, so that the germinating principle of the latter will not be injured by direct contact with the former.

The invention also has for its object the ready adjusting of a gage-roller to vary the depth of the furrow according to the depth the seed may be required to be planted.

To enable those skilled in the art to fully understand and construct my invention, I will proceed to describe it.

A A represent two parallel and horizontal iron bars, which are curved upward at one end, as shown at $a\ a$, to serve the purpose of handles, and curved or bent at the opposite end at right angles, and connected by a key, $b$, which also secures between the ends a draft-bar, B, as shown clearly in Fig. 2.

On the parallel parts of the bars A A a box or hopper, B', is placed. This box or hopper is divided by partitions $c\ d$ into three compartments, $e\ f\ g$. The compartment $e$ at the front part of the box is the fertilizing-compartment, the compartments $f\ g$ being for seed.

The bars A A are mounted on wheels C C, which are rigidly attached to their axle D, the latter having its bearings in plates $h\ h$, attached to each bar A A. In the bottom of the hopper B a slide, E, is placed and allowed to move freely in a transverse direction with the hopper, said slide being at the bottom of the compartments $f\ g$. Below the compartment $e$ of the hopper B' a slide, F, is placed, said slide working over the lower end of a short tube, $i$, which projects down from the compartment $e$ within an inclined tube, G, attached to the under side of the hopper. Both slides E F are perforated, as shown at $j$, and the bottom of the compartments $f\ g$ is perforated with a single hole, $j^{\times}$, directly under their partition $c$. The tube G projects forward in front of the hopper B', as shown clearly in Fig. 1.

To the inner side of each wheel C C projections H are attached. Two projections are shown attached to each wheel C, and the projections of one wheel are placed in opposite positions to those of the other.

The draft-bar B is of curved form, as shown clearly in Fig. 1, said bar curving upward and having a standard, I, fitted on it, so that it may slide back and forth thereon and be secured at any desired point by a key, $k$, as shown clearly in Fig. 1. A furrow-share, J, is also fitted on the draft-bar B in a similar way. In the lower end of the standard I a roller, K', is placed, which runs on the surface of the ground.

From the above description it will be seen that as the implement is drawn along the projections H on the wheels C will give a reciprocating movement to the slides E F, and that the slide F is operated a trifle in advance of the slide E, so that just previous to the dropping of the seed by the movement of slide E a quantity of the fertilizing material will be dropped from the compartment $e$ by the movement of slide F. By this means each dropping of seed will be planted contiguous to but not in direct contact with the droppings of the fertilizer, and all the benefit derived from the latter without the danger of the seed being injured by direct contact with it. If necessary, any proper stirring device may be placed in $e'$ to prevent the clogging of the fertilizing material.

The share J forms the furrow to receive the seed, and the furrows, it will be seen, may be made of greater or less depth by changing the position of the standard I on the draft-bar B, the effect being due to the curved form of the draft-bar, the share being elevated as the standard I is moved back and depressed as said standard is moved forward.

By having the two compartments $f\ g$ in the hopper, with one discharge-aperture, $j^\times$, directly under the partition $c$, and one slide, E, working in both compartments, it will be seen that the seed will be distributed alternately from each hopper, and consequently, when desired, two different kinds of seeds may be planted in alternate hills.

Having thus described my invention, what I claim as new, and desire to secure by Letters Patent, is—

The arrangement of two distributing-slides, E F, with the projections H H on the wheels C C, and two or more compartments in the hopper B', inclined tube G, inclined draft-bar B, and adjustable roller-standard I, substantially as and for the purpose set forth.

W. D. JOHNSON.

Witnesses:
R. L. FLEMING,
HENRY C. SMITH.